Figure 1:
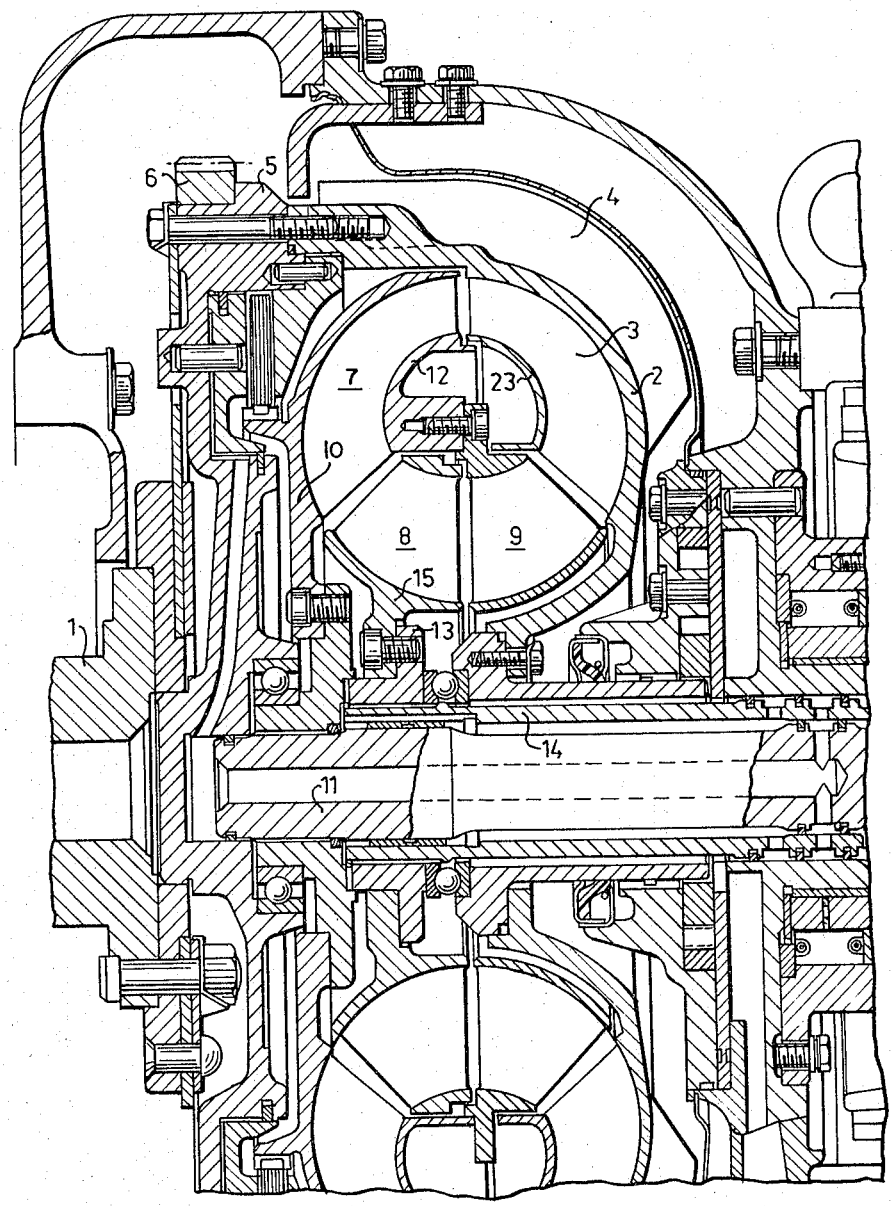

INVENTOR.
Sven-Olof Kronogård

Jan. 24, 1967   SVEN-OLOF KRONOGÅRD   3,299,636
APPARATUS FOR HYDRODYNAMIC TORQUE TRANSMISSION
Filed April 19, 1965                2 Sheets-Sheet 2

INVENTOR.
Sven-Olof Kronogård
BY
Pierce Scheffler & Parker
Attorneys

United States Patent Office 3,299,636
Patented Jan. 24, 1967

3,299,636
APPARATUS FOR HYDRODYNAMIC TORQUE TRANSMISSION
Sven-Olof Kronogård, Gothenburg, Sweden, assignor to Aktiebolaget Volvo, Gothenburg, Sweden, a company of Sweden
Filed Apr. 19, 1965, Ser. No. 449,018
2 Claims. (Cl. 60—54)

Hydrodynamic couplings and torque converters are used to an ever increasing extent, especially for automotive, but also industrial purposes. Hitherto it was common practice for each new range of use to design a special apparatus which fulfills the requirements existing in the particular range of use. Therefrom it follows that the manufacturer has to obtain, for each new order, new sets of moulds, casting models, etc., resulting of course in an increase of the manufacturing cost.

In order to reduce the costs within a particular range of use, such as torque conversion, for manufacturing of torque converters of equal size but different torque ratio conditions, it has been suggested to use identical elements except for turbine and reactor wheels which are designed with regard to their especial ranges of operation. Although it is possible thereby to reduce the manufacturing cost of a series of a certain type, the basic characteristics remain unchanged. For instance, single-stage torque converters of different designs will always function as single-stage converters for different operating conditions adapted to each particular purpose.

The object of this invention is still further to rationalize the manufacture of apparatuses for hydrodynamic torque transmission such that the entire basic character of the apparatus can be changed in spite of a single basic structure of an impeller member and a turbine member, wherein the exit of the impeller member and the entrance of the turbine member are located in the radially outer portion of the substantially circular flow path. An apparatus designed in accordance with the invention can be used both as a hydrodyanmic coupling and a single-stage or multi-stage torque converter having rigidly interconnected or free turbine stages. To obtain this object the invention is characterized in that at least one exchangeable element, such as a reactor member, a reactor member and a turbine member, two reactor members, or an unbladed shroud member, is provided in the radially inner portion of the flow path, whereby to obtain, in combination with said basic structure, different characteristics as to torque conversion or torque absorbed by the turbine.

Due to the fact that the exchangeable elements are located in the inner portion of the flow path they can be connected in a very simple manner to their respective shafts. A radial flange can serve as a connecting means between the element and an attaching member on the shaft so that the otherwise required rotor disc can be entirely avoided with corresponding reduced disc friction.

The invention will be explained more closely with reference to the annexed drawings.

FIG. 1 is a longitudinal sectional view of a hydrodynamic torque converter with associated parts for motor vehicles, FIGS. 2 to 7 are sectional views of the toric flow path of six apparatuses constructed in accordance with the invention.

Figure 2:
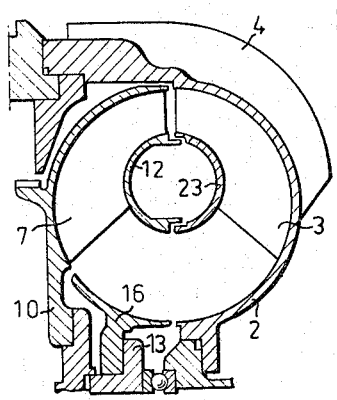
Figure 3:
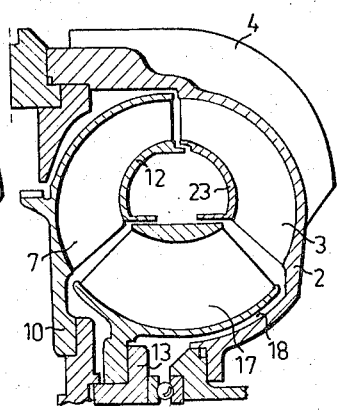
Figure 4:
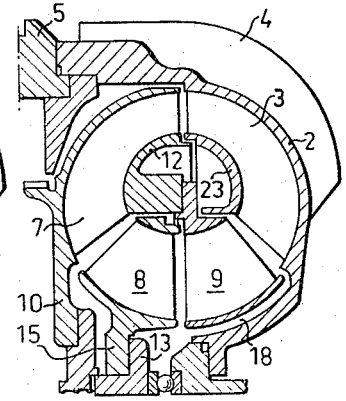
Figure 5:
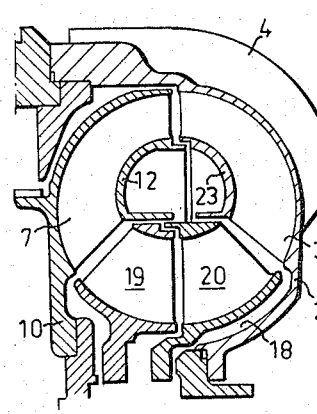
Figure 6:
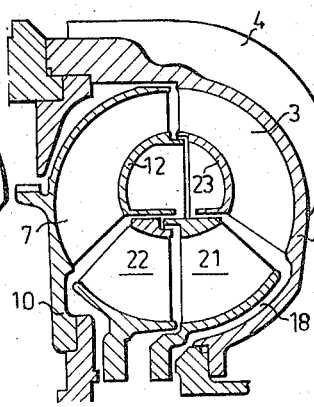
Figure 7:
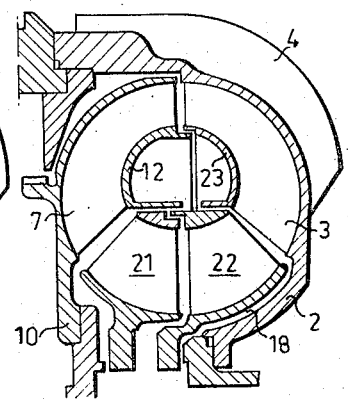

FIG. 2 illustrates a hydraulic coupling, FIG. 3 a single-stage torque converter, FIG. 4 a two-stage torque converter having rigidly interconnected turbine stages, FIG. 5 a single-stage torque converter including a two-part reactor member, FIG. 6 a two-stage torque converter including two turbine stages interconnected by a gear, and an intermediate reactor member, and FIG. 7 a torque converter of the kind shown in FIG. 6 but having a succeeding reactor member.

Referring to FIG. 1, reference numeral 1 denotes an input shaft which may be connected to the engine of a vehicle. The shaft 1 is also connected to the rotary casing 2 of a hydrodynamic torque converter. The casing 2 has internal impeller blades 3 and external fan blades 4 for cooling air. The blades 3 and 4 and the casing 2 are preferably a single-piece casting bolted to an end wall 5 which carries a toothed rim 6 for cooperation with a pinion on a starter motor, not shown. The parts 2 to 6 replace the usual flywheel of the engine.

In addition to the impeller blades 3 the circuit of the torque converter comprises a first bladed turbine stage 7, a bladed reactor member 8 and a second bladed turbine stage 9. The exit of the impeller member 3 and the entrance of the first turbine stage 7 are located in the substantially axial, radially outer portion of the flow path. The exit of the reactor member 8 and the entrance of the second turbine stage 9 are located in the radially inner portion of the flow path. The flow through the reactor member 8 and the second turbine stage 9 is also substantially axial.

The blades of the first turbine stage 7 are carried by a rotor disc 10 which by means of splines is mounted on a shaft 11 for transmission of torque to this shaft. The blades of the second turbine stage 9 are carried by the inner shroud 12 of the first turbine stage 7. Consequently, the torque from the second turbine stage is transmitted to the shaft 11 via the first turbine stage and the rotor disc 10. The blades of the first turbine stage 7 are comparatively long and very rigid so that the torque from the second turbine stage cannot cause detrimental stresses in the first turbine stage.

The reactor member 8 is bolted to a flange 13 which by means of splines is connected to a tubular shaft 14 which surrounds the shaft 11. Since the reactor member is located near the axis of the torque converter, it has practically no rotor disc but only a short, inwardly directed flange 15.

FIG. 2 illustrates the apparatus in the form of a hydraulic coupling. This coupling comprises the two basic elements of the torque converter shown in FIG. 1, namely, the casing 2 with the impeller blades and the turbine member 7. In this case, the flow path between the exit of the turbine member 7 and the entrance of the impeller is entirely unbladed. The outer shrouds of the impeller member and turbine member form the outside wall of the flow path. This wall is interrupted by an opening at the inner bend which is covered by a separate shroud member 16 secured to the flange 13 on the output shaft 14.

The single-stage torque converter shown in FIG. 3 also comprises the above named basic elements, namely, the casing 2 and the turbine member 7. Inserted between these two parts is a reactor member 17 which is bolted to the flange 13 and the blades of which substantially fill up the inner bend of the flow path and the outer shroud of which replaces the shroud element 16 in the coupling shown in FIG. 2. Because of the fact that the reactor member 17 extends to the entrance of the impeller a recess 18 is provided on the inside of the casing 2. The reactor member 17 extends into this recess such that the outside wall of the flow path is substantially continuous.

FIG. 4 illustrates the two-stage torque converter described above with reference to FIG. 1.

A further embodiment is shown in FIG. 5 which illustrates a single-stage torque converter comprising the casing 2 and the turbine member 7. Inserted between the exit of the turbine member and the entrance of the impeller are two reactor members 19 and 20 each of which may be combined with a free-wheeling device such that they can take part in the rotation upon increasing speed ratios, the arrangement being such that the reactor member 19 begins to rotate prior to the reactor member 20.

FIGS. 6 and 7 illustrate two-stage torque converters in which the two stages of the turbine are assumed to be interconnected by a gear. According to FIG. 6 the second turbine stage 21 is located immediately ahead of the impeller member 3. Inserted between the two turbine stages 7 and 21 is a reactor member 22 which is preferably mounted on a free-wheeling device. A free-wheeling device may be inserted in the gear between the turbine stages 7 and 21 to enable the second turbine stage 21 to rotate freely under certain conditions of operation.

The embodiment shown in FIG. 7 is identical to that shown in FIG. 6 except that the reactor member 22 is located after the second turbine stage 21 between the exit of the stage 21 and the entrance of the impeller 3.

From a comparison of the various embodiments it will be seen that the casing 2 of the coupling shown in FIG. 2 is somewhat different from the casing of the torque converters shown in FIGS. 3 to 7. Nevertheless there is only required a single mould for casting the structure which mould can be provided with inserts for changing the part 23 of the inner shroud or core of the flow path. Within the range of the recess 18 the wall of the casing 2 is made of greater thickness. To obtain the shape shown in FIG. 2, the casing is machined from the outside so as to be of uniform thickness whereas in the case of FIGS. 3 to 7 the casing 2 is machined from the inside to provide the recess 18. The turbine members 7 of the various embodiments are substantially identical except for the inner shroud 12 the shape of which can be varied by inserting different cores in the casting mould.

From the above it will be apparent that from the basic structure comprising the impeller casing 2 and the turbine member 7 a hydraulic coupling or hydrodynamic torque converters of different types can be built up. According to requirements the reactor part may be stationary, mounted on free-wheels for rotation in the same direction as the impeller, or used as a contra-rotating turbine. The turbine and reactor members can be mounted on shafts which in a manner known per se may be interconnected by the intermediary of planetary gears which may be combined with free-wheel units.

The invention is not limited to the embodiments described above and illustrated in the drawings but can be modified as to details of construction within the scope of the appending claims. Although the best advantages are considered to be obtained in apparatuses exclusively comprising cast elements the invention may equally well be applied in cases where only one or a few number of elements are made by casting while other elements consist of riveted or otherwise interconnected parts. The number and shape of the blades of each element can be varied by inserting different cores in the casting operations. It is thus possible to obtain different types of blade patterns in a single mould resulting in that the various members in the flow path can be adapted to each other such as to result in a maximum efficiency.

It should also be noted that the round shape of the flow path results in a small external diameter of the apparatus and also reduces disc friction due to the fact that the rotor disc of the elements located at the inner bend can be practically entirely avoided.

What I claim is:

1. An apparatus for hydrodynamic torque transmission including a basic structure comprising an impeller member and a turbine member, the exit of the impeller member and the entrance of the turbine member being located in the radially outer portion of a substantially circular flow path, and at least one exchangeable element, such as a reactor member, a reactor member and a turbine member, two reactor members or an unbladed shroud member, being provided in the radially inner portion of said flow path, whereby to obtain, in combination with said basic structure, different characteristics as to torque conversions or torque absorbed by the turbine member.

2. An apparatus for hydrodynamic torque transmission including a basic structure comprising an impeller member and a turbine member, the exit of the impeller member and the entrance of the turbine member being located in the radially outer portion of a substantially circular flow path, and at least one exchangeable element, such as a reactor member, a reactor member and a turbine member, two reactor members or an unbladed shroud member being provided in the radially inner portion of said flow path, whereby to obtain, in combination with said basic structure, different characteristics as to torque conversions or torque absorbed by the turbine member and a recess (or recesses) for the shrouds of said elements being selectively insertable in the flow path, said recesses being provided on the inside of the part or parts of the outer shroud of the basic members, which part or parts form outer walls of said inner portion of the flow path.

References Cited by the Examiner

UNITED STATES PATENTS

| | | | |
|---|---|---|---|
| 2,301,451 | 11/1942 | Pollard | 60—54 X |
| 2,465,739 | 3/1949 | McGill | 60—54 X |
| 2,954,672 | 10/1960 | Mamo | 60—54 |
| 3,079,756 | 3/1963 | Farrell | 60—54 |
| 3,152,446 | 10/1964 | Foerster et al. | 60—54 |
| 3,205,662 | 9/1965 | Gabriel | 60—54 |

EDGAR W. GEOGHEGAN, *Primary Examiner.*